(12) United States Patent
Haley

(10) Patent No.: US 7,054,851 B2
(45) Date of Patent: May 30, 2006

(54) COMMUNICATION DATA FORMAT FOR USE IN DATA STORAGE AND RETRIEVAL

(75) Inventor: John D. Haley, Honey Brook, PA (US)

(73) Assignee: Siemens Medical Solutions Health Services Corporation, Malvern, PA (US)

( * ) Notice: Subject to any disclaimer, the term of this patent is extended or adjusted under 35 U.S.C. 154(b) by 544 days.

(21) Appl. No.: 10/079,305

(22) Filed: Feb. 19, 2002

(65) Prior Publication Data

US 2003/0050912 A1    Mar. 13, 2003

Related U.S. Application Data

(60) Provisional application No. 60/300,740, filed on Jun. 25, 2001.

(51) Int. Cl.
    *G06F 17/30* (2006.01)

(52) U.S. Cl. .......................................................... 707/1

(58) Field of Classification Search .................... 707/1, 707/2, 3, 102, 10, 103, 103 R, 103 Y; 709/237, 709/206, 223, 202, 315; 713/201; 715/505; 370/216
See application file for complete search history.

(56) References Cited

U.S. PATENT DOCUMENTS

| | | | | |
|---|---|---|---|---|
| 4,814,761 A | | 3/1989 | Takahashi et al. ..... 340/825.05 |
| 4,885,765 A | * | 12/1989 | Shirakawa ............... 379/93.23 |
| 5,301,280 A | * | 4/1994 | Schwartz et al. ........... 709/237 |
| 5,305,316 A | | 4/1994 | Yoshida et al. ............ 370/85.1 |
| 5,455,570 A | | 10/1995 | Cook et al. ............ 340/825.22 |
| 5,524,253 A | * | 6/1996 | Pham et al. ................ 709/202 |
| 5,598,576 A | | 1/1997 | Hsu et al. ................... 395/822 |
| 5,600,683 A | | 2/1997 | Bierach et al. ............. 375/363 |
| 5,657,347 A | | 8/1997 | Morj .......................... 375/225 |
| 5,703,936 A | | 12/1997 | Tsuchida et al. .............. 379/88 |
| 5,764,955 A | * | 6/1998 | Doolan ....................... 709/223 |
| 5,797,029 A | | 8/1998 | Hsu et al. ................... 395/825 |
| 5,812,663 A | | 9/1998 | Akiyama et al. .............. 380/4 |
| 5,822,615 A | | 10/1998 | Yamashita et al. .......... 395/830 |
| 5,878,079 A | | 3/1999 | Morj .......................... 375/225 |
| 5,889,943 A | * | 3/1999 | Ji et al. ....................... 713/201 |
| 5,933,595 A | | 8/1999 | Iisuka et al. ........... 395/183.11 |
| 6,016,497 A | * | 1/2000 | Suver ..................... 707/103 R |
| 6,067,583 A | | 5/2000 | Gilbert .......................... 710/8 |
| 6,094,212 A | | 7/2000 | Imaeda ........................ 348/14 |
| 6,122,682 A | | 9/2000 | Andrews ...................... 710/65 |
| 6,151,609 A | * | 11/2000 | Truong ....................... 715/505 |
| 6,175,880 B1 | | 1/2001 | Hsu et al. ...................... 710/5 |
| 6,182,119 B1 | * | 1/2001 | Chu .......................... 709/206 |
| 6,182,163 B1 | | 1/2001 | Yamashita et al. ............ 710/12 |
| 6,297,856 B1 | | 10/2001 | Nakamura et al. .......... 348/705 |
| 6,618,368 B1 | * | 9/2003 | Tanigawa et al. ........... 370/352 |

(Continued)

*Primary Examiner*—Etienne P. LeRoux
(74) *Attorney, Agent, or Firm*—Alexander J. Burke

(57) ABSTRACT

A communication system and data format extracts required object data from a database and updates the database with amended or new object data and associated data relationships following optional modification of the object data by an external system. A communication data format is used for communicating data between applications for storage and retrieval. The data format includes a data field for conveying a data item and a plurality of attributes associated with the data field. The plurality of attributes include a data type identifier for use in determining an executable procedure to be used in processing the data item, and at least one other attribute used in determining particular operations to be applied in processing the data item by the executable procedure.

16 Claims, 4 Drawing Sheets

U.S. PATENT DOCUMENTS

| | | |
|---|---|---|
| 6,708,186 B1 * | 3/2004 | Claborn et al. ............. 707/102 |
| 6,748,388 B1 * | 6/2004 | Kasamsetty et al. .......... 707/10 |
| 6,928,487 B1 * | 8/2005 | Eggebraaten et al. ....... 707/102 |
| 2001/0018689 A1 * | 8/2001 | Spence et al. .......... 707/103 R |
| 2001/0047294 A1 * | 11/2001 | Rothschild ................... 705/14 |
| 2003/0014421 A1 * | 1/2003 | Jung .......................... 707/102 |
| 2003/0163479 A1 * | 8/2003 | Mathews et al. ........... 707/102 |

* cited by examiner

| ATTRIBUTE NAME | DESIGN-TIME | RUN-TIME |
| --- | --- | --- |
| ClassName | X | |
| IsIndexed | X | |
| MaxLength | X | |
| ReadOnly | X | |
| Repeats | X | |
| RepeatOf | X | |
| RepeatDepth | X | |
| FilterOnSubclass | X | |
| AppliesTo | X | |
| InstanceClassname | | X |
| IsNullObject | | X |
| OID | | X |
| AttributeDirty | | X |
| ObjectDirty | | X |
| Placeholder | | X |

FIG. 2

COMMUNICATION DATA FORMAT FOR USE IN DATA STORAGE AND RETRIEVAL

This is a non-provisional application of provisional application Ser. No. 60/300,740 by J. D. Haley filed Jun. 25, 2001.

FIELD OF THE INVENTION

This invention concerns a data format and related communication system for use between executable applications in requesting, amending and updating stored data.

BACKGROUND OF THE INVENTION

A significant proportion of software code of a typical executable application is devoted to moving data from one place to another, to managing data relationships or to preventing access to data by unauthorized users. In a multi-tiered application partitioned into multiple operating layers, the more layers used, the more data it is necessary to transport and convert between layers, for example. Such physical data transportation involves determining how data types in one layer map to data types in another layer and requires executable code to be provided to perform the conversion (e.g., from C language format, to Java language format, to COM data type etc). Specifically, code is required to map each data item (object property) between different operating layers and to manage the data relationships involved.

The data relationships involved are typically maintained in one or more tables in relational databases holding object properties. A table may hold object properties such as object type or class, for example. Data relationships are created and managed by employing code to create composite objects (objects, which contain, or refer to other objects) by collating tables or properties within tables. Thereby a data relationship, comprising a reference of one object to another object, is created by incorporating composite objects in one or more related tables, for example.

The transport of data including composite objects between different applications in different system presents a problem. Specifically, when data including a composite object is transported between applications in different systems, it is necessary that the original relationships associated with the composite object are determined and conveyed. Similarly, when data is received by an application in one system from a different application in another system, it is necessary that the receiving application be able to identify new objects and relationships created by the sending application. In addition, it is also desirable in a system for conveying data including composite objects to incorporate a method for amending or deleting data relationships and for preventing unauthorized users from accessing secure data. A communication data format and related communication system according to invention principles addresses these requirements and associated problems.

SUMMARY OF INVENTION

A communication system and data format extracts required object data from a database and updates the database with amended or new object data and associated data relationships following optional modification of the object data by an external system. A communication data format is used for communicating data between applications for storage and retrieval. The data format includes a data field for conveying a data item and a plurality of attributes associated with the data field. The plurality of attributes include a data type identifier for use in determining an executable procedure to be used in processing the data item, and at least one other attribute used in determining particular operations to be applied in processing the data item by the executable procedure.

BRIEF DESCRIPTION OF THE DRAWING

FIG. 2 shows attributes associated with a data field for conveying a data item in a data format used in communicating data between applications for storage and retrieval, according to invention principles.

DETAILED DESCRIPTION OF PREFERRED EMBODIMENTS

Figure 1:
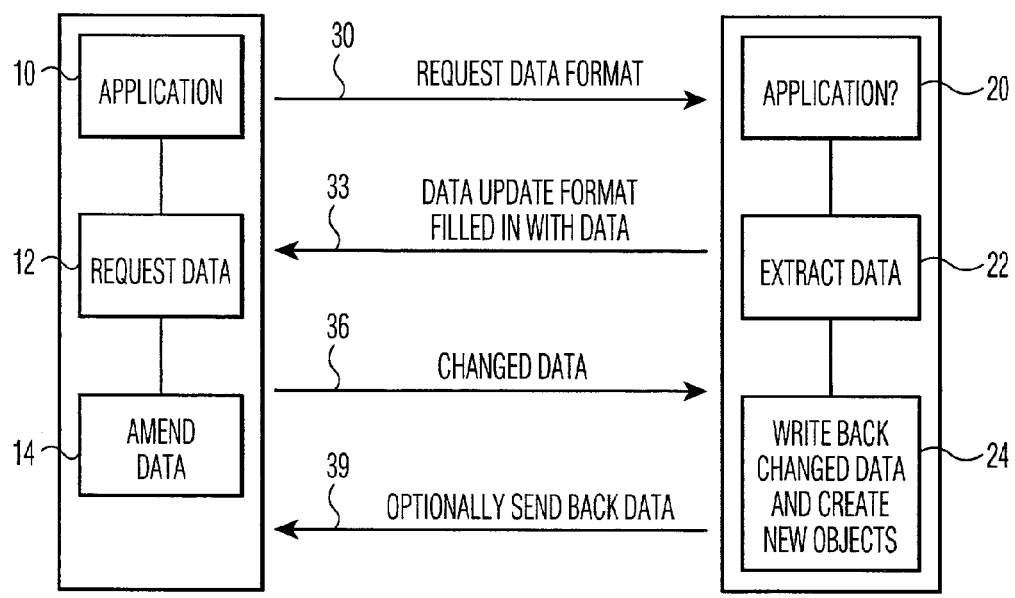
FIG. 1 shows a system employing a data format for extracting required object data from a database and updating the database with amended or new object data and associated data relationships, according to invention principles.

FIG. 1 shows a system employing a data format for extracting required object data from a database and updating the database with amended or new object data and associated data relationships. Application 10 communicates a request for data 30 to application 20 using a data request format in accordance with invention principles. In response to the received data request 30, application 20 extracts (22) the exact amount of needed data from a set of related data objects held by application 20 in a database and incorporates the requested data into request data format 30 to produce format 33 for communication to application 10. Application 10 amends (14) the requested data 12 and communicates the amended data to application 20 using a data update format 36 according to invention principles. The update data format incorporates a data attribute associated with a data field conveying amended non-read-only data to preclude rejection of the amended data by application 20. In addition, the data request format and data update format advantageously include other attributes for efficiently conveying data between applications and for accessing and updating object data and associated relationships. The term attribute is used in the claims (and elsewhere herein) to mean an indicator, identifier or other code for use in identifying an operation or function to be performed or to be excluded from being performed in processing data conveyed in a data request format or data update format. An attribute is used to track information about an individual data object and object property such as its data type, associated constraints or whether it is updateable or has been updated for example. An attribute is also used to determine data constraints (e.g., to indicate that user entry of a data object is required) and to structure XML statements to store complex data object relationships and to identify new relationships.

In response to receiving the data update communication 36, application 20 creates new data objects and stores (24) the amended data and new objects into the database holding the related business objects. Application 20 retrieves and communicates the business objects, including amended data, back to application 10 for verification and confirmation that the amended data and associated new data relationships are successfully and correctly stored. The data request format 30 is an Extensible Markup Language (XML) structured data format comprising a template including locations to be occupied with requested data elements as hierarchically arranged data objects. Individual requested data elements and their locations are demarcated and identified by data element identifiers (tags) and are accompanied by associated attributes. Extensible Markup Language (XML) is an Internet standard used to encode structured data passed between computer systems. The World Wide Web Consortium maintains this public standard and information about XML is available at http://www.w3.org/XML.

The data request format 30 is communicated to application 20 which identifies and extracts the requested data elements from a set of related data objects held by application 20 in an internal database using the data element identifier tags. Application 20 forms the response data format 33 for communication to application 10 by inserting the identified requested data elements in the received data request format 30 in corresponding locations demarcated by the data element identifier tags. The data request format may be predetermined (during a specification, design or other precursor phase, for example) for acquiring data elements from an external application 20 at a subsequent time (such as an operation, execution or run-time of an application 20 procedure, or at some other subsequent time). At the subsequent time, the data request format empty locations identified by data element identifiers (tags) are filled in with the actual data values (and associated attributes) available from application 20.

Application 20 edits the received data request format 30 prior to inserting the identified requested data elements in format 30. This is done in order to remove data element identifier tags (and other associated format 30 XML statements) that need to be filled in with secure data elements held by application 20 for which the requestor does not have authorization to access. In another embodiment this editing may be performed by application 10 prior to communication of data request format 30 to application 20.

Data element identifier tag names of data request format 30 identify locations to be occupied with-requested data elements or object properties as hierarchically arranged data objects defined in program code. In the hierarchically arranged format structure the highest structure tag identifies a Class name demarcating a location to be filled by a data object (as opposed to a simple string or integer) and holds a full class name. The full class name designates that the object type is checked upon incorporating data into the object location and may be used to allow new objects to be created at a run-time (i.e. execution time) of an application 20 procedure responding to receiving format 30. Specifically, once a name of a Class is known, application 20 is able to create instances (objects) of the Class. For this purpose, the Class name is used to identify an object factory object (an object that creates other objects), or a default Class constructor method (having the same name as the Class of the object and requiring no additional parameter data). Such a newly created object is incorporated in the Class name location at run-time. As known in the art, object-oriented programming language Class is used to define properties of an object and associated methods (procedures). A Class typically defines its own unique properties in addition to inheriting some properties. One important property is an Object Identifier attribute (OID—discussed later in connection with item 229 of FIG. 2) used to uniquely identify object instances.

An exemplary hierarchically arranged data request format 30 is structured as follows:

```
XML Tags:
    <PATIENT>
        <aPERSON>
            <NAME>
        </aPERSON>
    </PATIENT>
Java Code:
    public class PATIENT
    {
        public PersonClass aPERSON;      //property that references
        a person
        public CodedValue GENDER;        //property that references
        a gender
    }
    public class PersonClass
    {
        public String NAME;              //property whose value
                                         is a string
```

In data request format 30 there is one main data object (associated with a Class name) and the main data object encompasses other objects. In the simple example above the PATIENT is the main data object. In another example, a more complex main data object references several or all the objects that participate in a business process or transaction. The data object relationships are defined by hierarchical embedding of identifier tag names representing object references. The hierarchical embedding represents an object composition whereby complex objects are composed of other objects in a programming language such as Java. In the example above, the Patient object was composed of a person object. Object references are represented by value. Thereby, rather than storing just an identifier for a referenced object, the object with all its associated objects and properties are stored. Two references to the same object may result in two copies of some of the object's data. Further, two references to the same object result in two entries for this same object in the hierarchical embedding structure of format 30. The exemplary data format 30 comprises a subset of a total object composition and a subset of the properties of each object. Pointers (e.g., XML Xpointers) or actual program references are not necessary in the XML code of data format 30.

In a further example presented below, a PATIENTENCOUNTER relates a patient to a payer by holding references to both. If the patient pays the bill, the two instances of PERSON below are the same person and some of the person data may be duplicated in the XML format 30 (in this case the person's address). The PATIENT is indeed the PAYER because the Object Ids are the same ("1234").

```
<PATIENTENCOUNTER>
    <PATIENT>
        <aPERSON OID="1234">
            <GENDER>
            <ADDRESS>
        </aPERSON>
    </PATIENT>
    <PAYER>
        <aPERSON OID="1234">
            <ADDRESS>
```

```
        </aPERSON>
      </PAYER>
</PATIENTENCOUNTER>
```

FIG. 2 shows attributes associated with a data field for conveying a data item in data format 30 (FIG. 1) used in communicating data between applications 10 and 20 for storage and retrieval. Attributes 205–223 are determinable at a design or other precursor phase e.g. when an object is created. Attributes 225–235 are determinable at operation, execution or run-time of an external application (e.g. of a procedure of application 20 responding to format 30 data request) and are not determinable when an object is created. As previously explained, ClassName attribute 205 identifies a location to be filled by a data object (as opposed to a simple string or integer) and holds a full class name. At a pre-cursor design time, for example, ClassName 205 allows an editor to determine what data elements (object properties) may be added in data request format 30 to an object identified by particular tag names. Also the full class name designates that the object type is checked upon incorporating data into the object location and may be used to allow new objects to be created at a run-time (i.e. execution time) of an application 20 procedure responding to receiving format 30.

Another design-time specified attribute identifies whether an associated data object conveyed in a data field is updateable. Specifically, ReadOnly attribute 211 identifies whether or not a data object is read-only and is not amendable. A further design-time specified attribute 209 identifies the maximum number of characters that can be entered in the data object data field. Also, data format 30 employs a default data type (String data type) in ClassName attribute 205 and a default ReadOnly attribute (indicating data is not read-only) if these attributes are not otherwise specified. An exemplary XML data format 30 structure with attributes indicating these features is:

```
<Patient ClassName="com.tnt.Patient">
    <aPerson ClassName="com.tnt.Person">
        <Name ReadOnly="true">
        <Occupation MaxLength=32>
    </aPerson>
</Patient>
```

Attributes 225–235 are determinable at run-time of an external application (e.g. of a procedure of application 20 responding to format 30 data request). Attributes 225–235 include attributes that convey object identity and a property indicating whether an object is updated, for example. In the data request format 30, objects are uniquely identified by an Object Identifier attribute (OID—item 229 FIG. 2). An OID comprises a unique string assigned to an existing object so that the object may be identified in computer program memory if the object is updated by an external system (e.g. application 20). An object without an Object Identifier is indicative of a new object freshly created in computer memory. Further, an object that is updated is marked with AttributeDirty 231. AttributeDirty 231 is set to "INSERT" if the relationship object is new, otherwise it is set to "UPDATE". Both AttributeDirty 231 (an attribute of the object property) and ObjectDirty 233 (an attribute of the object itself with the associated object property) are used in identifying an updated property of an object in data format 30.

Further, null object references of data format 33 are represented with Placeholder attribute 235 (FIG. 2) set to true, so that empty object property fields may be filled in by external application 10 (FIG. 1). An exemplary XML data format 33 structure showing use of Placeholder attribute 235 is:

```
<Patient ClassName="com.tnt.Patient" Placeholder="true">
    <Person ClassName="com.tnt.Patient">
        <Name ReadOnly="true">
        <Occupation MaxLength=32>
    </Person>
</Patient>
```

Placeholder attribute 235 is set by either application 20 or application 10. If application 10 requests an object within an object using data request format 30, application 20 examines whether a reference (or association) to the object within the object exists. If it does not currently exist, application 20 considers the reference "null", and application 20 returns to application 10 a new "intialized" object (object with default values as created by an object factory or class constructor method). The new object gets the Placeholder attribute 235. Application 10 optionally modifies (fills in) the new object. If the new object is modified then application 10 removes Placeholder attribute 235 and adds ObjectDirty 233. If application 10 does not change the new object and sends it back to application 20, application 20 ignores the new object.

In another example, an existing object reference (object within an object) exists and is sent to application 10 from application 20. Application 10 optionally chooses to break the relationship (reference) by adding Placeholder attribute 235, IsNullObject attribute 227 and AttributeDirty 231. Upon application 20 determining that the object is changed and that it is now to be a null object, application 20 sets the reference to the object to "null", thereby removing the relationship (reference).

If application 10 (FIG. 1) fills in a Placeholder in data format 33 to form a data format 36, a corresponding Placeholder attribute 235 is removed and associated AttributeDirty 231 (set to "INSERT") and ObjectDirty 233 are added. These features, together with an absence of an OID 229 signifies to application 20 on receiving data format 36 that a new object needs to be created. Placeholder objects returned by application 20 are ignored unless they include AttributeDirty 231 (set to "INSERT") and ObjectDirty 233 and also include an associated IsNullObject attribute 227 set to true. The setting of IsNullObject attribute 227 to true by application 10 also indicates an existing relationship is removed from a set of related data objects maintained in a database by application 20. Application 20 does this by setting the associated object property to a null value. Further, ReadOnly attribute 211 in data format 30 & 33 informs receiving application 10 that an associated data object is not to be modified.

Application 20 (FIG. 1) extracts data requested by request format 30 from a set of related data objects and associated relationships, held by application 20 in a database and incorporates the requested data into the request data format 30 to produce filled format 33 for communication to application 10. However, the number of relationships held by application 20 in the database may not be known until run-time of an application 20 procedure employed in responding to the format 30 data request. Although the number of relationships in the database may not be known until run-time, the type of relationship associated with a particular object is known when the particular object is created prior to runtime, for example. Such a particular object may comprise either a simple repeating object (a homogeneous collection of data) or a repeating nested object (a homogeneous tree structure collection of data), for example. An exemplary XML data format 30 structure showing a simple repeating object is:

```
<Patients ClassName="com.tnt.Patient" IsIndexed="true">
    <Patient ClassName="com.tnt.Patient">
        <Name>
        <Occupation>
    </Patient>
    <Patient ClassName="com.tnt.Patient">
        <Name>
        <Occupation>
    </Patient>
    ...
</Patients>
```

The exemplary XML simple repeating object structure uses an IsIndexed attribute 207 that determines that an associated object comprises a list of objects to be filled with requested data.

An exemplary XML data format 30 structure showing a repeating nested object is:

```
<Person Repeats="true">
    <birthDate/>
    <Parent RepeatOf="/Person" RepeatDepth="*"/>
</Person>
```

The exemplary XML repeating nested object structure uses Repeats, RepeatOf, and RepeatDepth attributes 213, 215 and 217 respectively. RepeatOf attribute 215 signifies that repetitions of an object are of the same type as the original object. RepeatDepth attribute 217 determines a limit to the number of times an object is to be repeated. A RepeatDepth="*" means that an object is to be repeated indefinitely. Repeats attribute 213 is optional and may identify an object that is to be repeated at a later time. This attribute may be used to enhance performance by keeping a copy or a reference to an item that repeats later in XML data request format 30.

A basic type of an object may be known when the particular object is created. However a particular object category (object type subclass) within the basic type may not be known until run-time of an application 20 procedure employed in responding to the format 30 data request. An example is an object property which conveys identity information of an individual person (the basic type of the object is person identity information) and includes a gender property (a particular Male or Female object category) that is not known until the application 20 procedure run-time. Further, each type of person may have different properties which may need to be collected. An exemplary XML data format 30 structure for requesting data elements depending on a particular gender category-of a person is:

```
<Person FilterOnSubclass="true">
    <Age AppliesTo="Female, Male"/>
    <LastPapTest AppliesTo="Female"/>
</Person>
```

FilterOnSubclass attribute 219 (FIG. 2) specifies that only the properties that apply to the current object category (not known until application 20 procedure runtime) are relevant. In the example above if the current object category is Female, both the Age and LastPapTest properties apply. If the object category is Male, only the Age property applies and the LastPapTest property is ignored. The above exemplary XML format structure also illustrates the use of an AppliesTo attribute 223. Specifically, AppliesTo attribute 223 indicates that an object property is used in object categories (object type subclasses) detailed in an AppliesTo attribute 223 element string (e.g., AppliesTo ="Male, Female" in the previous exemplary XML format 30 structure). Further, an object property without an AppliesTo attribute 223 in data request format 30 means that the object property is used in all associated object categories (object type subclasses).

Data request format 30 employs the previously described FilterOnSubclass attribute 219 (FIG. 2) for use in filtering data elements prior to their incorporation in format 30 (FIG. 1) to produce format 33. The use of FilterOnSubclass attribute 219 and AppliesTo attribute 223 enable XML data request format 30 to be tailored at run-time of an application 20 procedure employed in responding to the format 30 data request. Thereby the design-time XML format 30 is adapted to form a corresponding different XML format 30 at runtime of an application 20 procedure. Also, a design-time XML format 30 may be further adapted, by removal of the XML format 30 FilterOnSubclass and AppliesTo attributes 219 and 223 following a filtering operation employed at runtime. In the previous exemplary XML data format 30 structure for requesting data elements depending on a particular gender category of a person, the runtime XML for a "Male" becomes after filtering, for example:

```
<Person OID="1234">
    <Age>38</Age>
</Person>
```

A particular object category (object type subclass) within a basic type of an object may be known when the particular object is created (for example a Male Person object). However, the object property itself is defined as a more basic type such as Person. In this case the basic type may be substituted in XML format 30 for the more specific or derived type. An exemplary XML data format 30 structure for performing such a substitution employs an InstanceClassname attribute 225 in the following manner:

```
<Man ClassName="Tnt/Person" InstanceClassName="Tnt/Male">
    <Age/>
    <Address/>
</Man>
```

InstanceClassName attribute 225 determines the actual particular object category of the current object and associated ClassName attribute 205 matches the type of the object property.

As previously discussed, data element identifier tag names of data request format 30 identify locations to be occupied with requested data elements or object properties as hierarchically arranged data objects defined in program code. The XML data request format 30 uses Get and Set methods defined in an object for getting data into and out from the object locations to be occupied. A public application 20 procedure that starts with "get" and uses no parameters is considered an object property which is obtainable from an object. This enables a complex application 20 procedure that derives values to appear like a simple property to receiving application 10. Similarly, a public application 20 procedure that starts with "set" and that uses a parameter of appropriate type is considered an object property that may be written into. Further, the XML data request format 30 may be amended to request additional public data contained by an object referenced by application 20 or to remove data.

An application 20 security procedure examines data prior to its incorporation in data request format 30 (for producing format 33). The security procedure excludes secure data for which the requesting application 10 (and requester) is unauthorized access. The data is excluded from incorporation in format 30 by the application 20 security procedure at the application 20 run-time. The application 20 security procedure also eliminates from XML format 30 the tag identified locations to be occupied with requested data elements (and associated branches of data). This is done before format 30 is used to extract object data by application 20. Alternatively, format 30 may be amended by application 10 before it is communicated to application 20.

Figure 3:
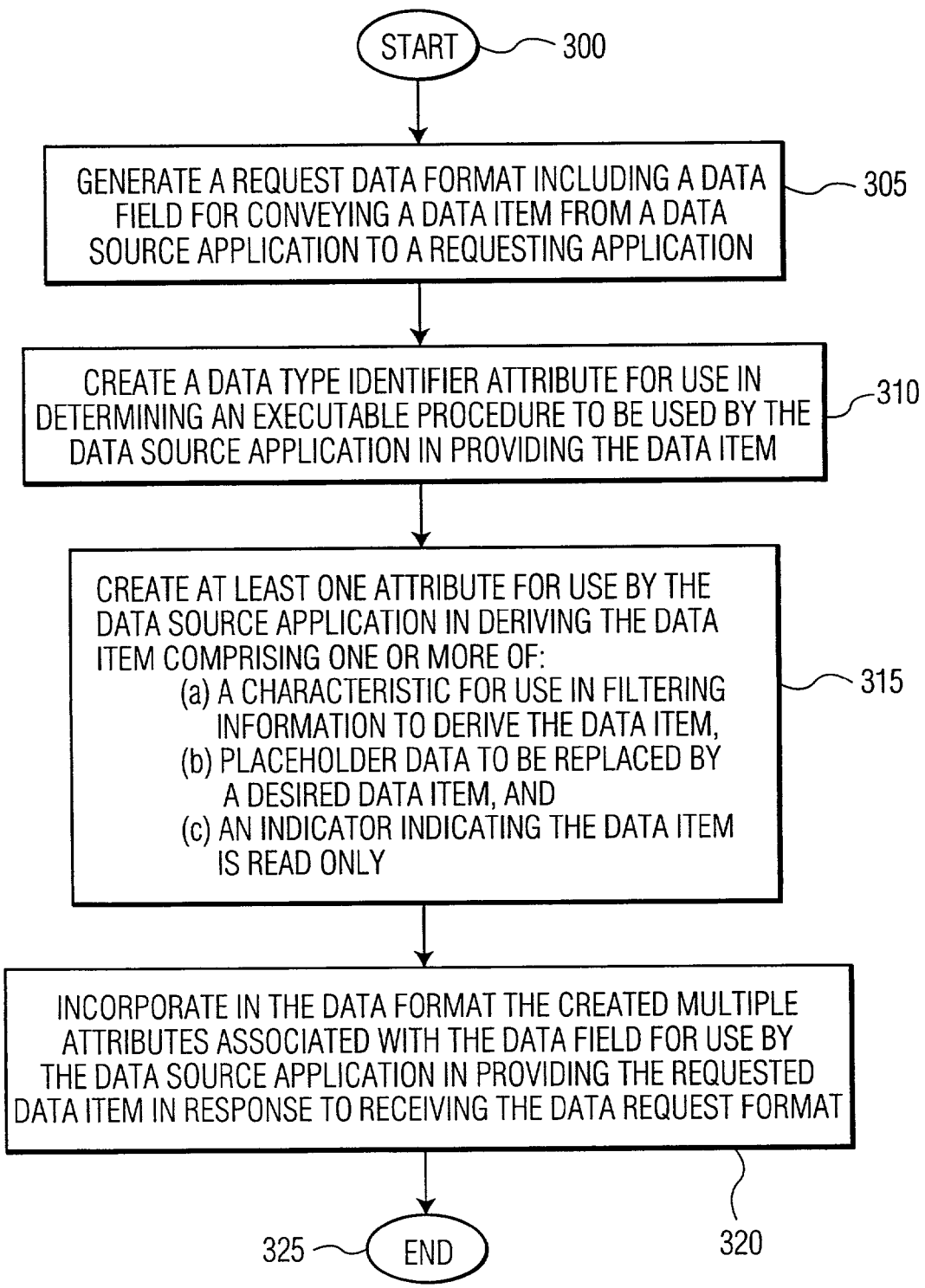
FIG. 3 shows a flowchart of a process employing a data request format used by a first application in acquiring data from a second application, according to invention principles.

FIG. 3 shows a flowchart of a process employing data request format 30 (FIG. 1) used by application 10 in acquiring data from application 20. In step 305, after the start at step 300, application 10 initiates generation of XML data request format 30 including at least one data field for conveying a data item from application 20 to application 10. In step 310 application 10 incorporates a data type identifier (ClassName attribute 205 of FIG. 2) for identifying the type of data (e.g., data object or string or integer etc.) to be conveyed in the data field of step 305. The data type identifier (ClassName attribute 205 of FIG. 2) is used by application 20 in determining a procedure to be used in processing the data item. Such processing may comprise operations such as acquiring, formatting, interpreting or converting the data item to be compatible with application 10 or for use in communicating the data item to application 10, for example. In another embodiment, the data type identifier may be used to identify an application procedure for use in executing data item code, or for processing a data item for interfacing purposes or for another function.

In step 315 application 10 creates one or more attributes in the XML data request format 30 for use by application 20 in acquiring or deriving the data item to be conveyed back to application 10. Such attributes comprise a characteristic for use in filtering information to derive the data item, or an indicator signifying the data item is read-only, for example. Other attributes that may be included comprise those previously described in connection with FIG. 2. In step 320 application 10 incorporates the created attributes in the XML data request format 30. The incorporated attributes are used by application 20 in providing the requested data for communication to application 10 in response to receiving format 30. The process of FIG. 3 ends at step 325.

Figure 4:
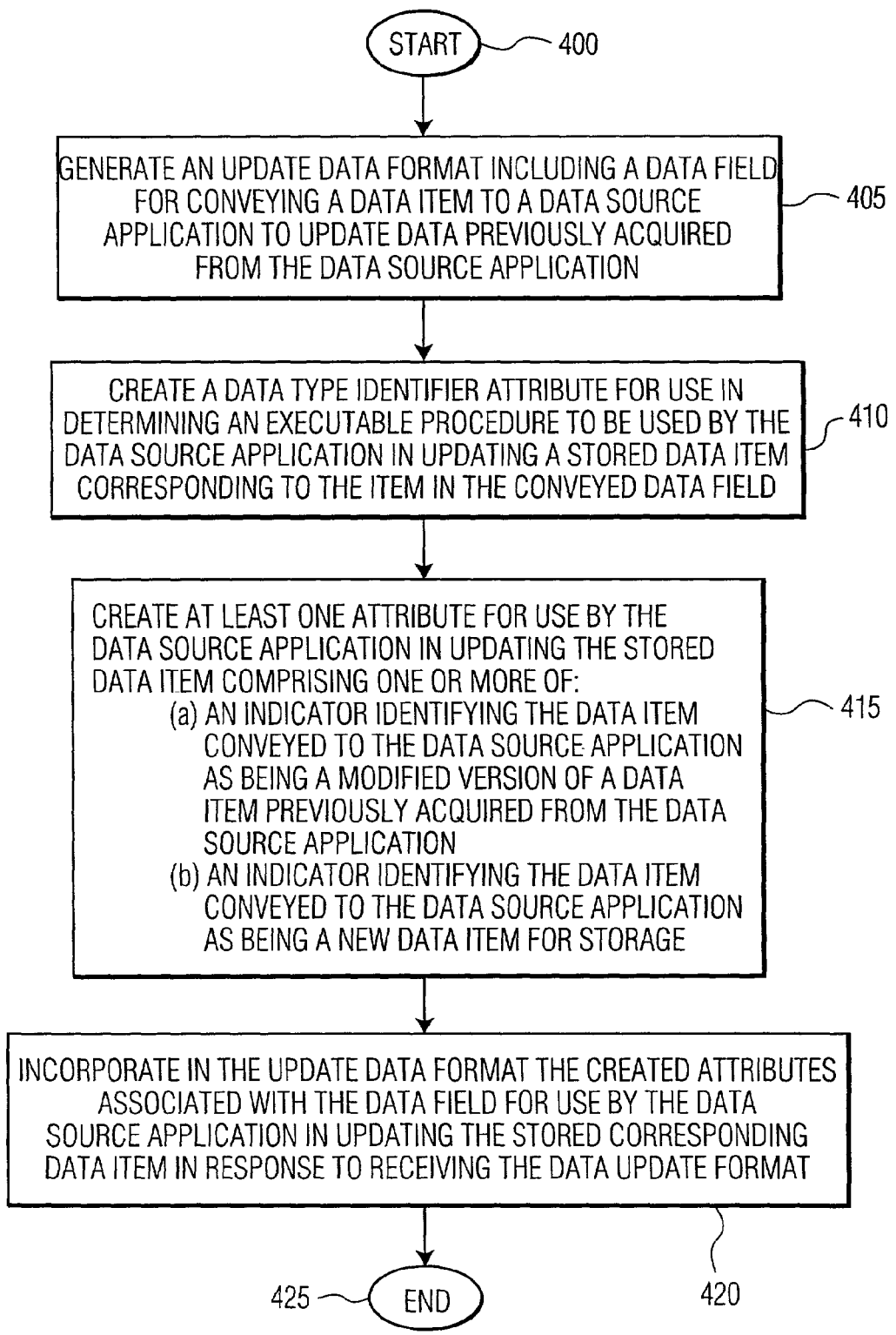
FIG. 4 shows a flowchart of a process employing a communication data update format for use by a first application in updating data acquired from a second application and communicating the updated data to the second application, according to invention principles.

FIG. 4 shows a flowchart of a process employing a communication data update format for use by application 10 in updating data acquired from application 20 and communicating the updated data to application 20. In step 405, after the start at step 400, application 10 initiates generation of XML data update format 36 (FIG. 1) including at least one data field for conveying a data item from application 10 to application 20 to update data previously acquired from application 20. In step 410 application 10 incorporates a data type identifier (ClassName attribute 205 of FIG. 2) for identifying the type of data (e.g., data object or string or integer etc.) to be conveyed in the data field of step 405. The data type identifier (ClassName attribute 205 of FIG. 2) is used by application 20 in determining a procedure to be used in updating a data item corresponding to the item in the data field and accessible in a database using application 20. Such a procedure may comprise operations such as formatting, interpreting or converting the data item to be compatible with storage format or other database requirements or application 20 requirements. In another embodiment, the data type identifier may be used to identify an application procedure for use in executing data item code, or for processing a data item for other interfacing purposes or for another function.

In step 415 application 10 creates one or more attributes in the XML data request format 36 for use by application 20 in updating the data item stored in the database and corresponding to the item in the data field. Such attributes comprise an indicator identifying the data item conveyed to application 20 as being a modified version of a data item previously acquired via application 20 or an indicator identifying to application 20 that the data item is a new data item for storage, for example. Other attributes that may be included comprise those previously described in connection with FIG. 2. In step 420 application 10 incorporates the created attributes in the XML data update format 36. The incorporated attributes are used by application 20 in updating the data item stored in the database and corresponding to the item in the data field in response to receiving format 36. The process of FIG. 4 ends at step 425.

The systems and processes presented in FIGS. 1–4 are not exclusive. Other architectures and processes may also be derived in accordance with the principles of the invention to accomplish the same objectives. Further, the inventive principles may be advantageously employed in any systems involving data update and/or retrieval between applications. Further, the inventive principles apply to any data format structure involving a data field for conveying data between applications and is not limited to use in XML, SGML (Standardized Generalized Markup Language) or HTML (Hyper Text Markup Language) type structured formats.

What is claimed is:

1. A communication data format embodied in a computer readable storage medium, said communication data format being for use in communicating data between different executable applications for storage and retrieval, comprising:
    a data field for conveying a data item acquired from a first executable application in response to a request data format including said data field from a different second executable application; and
    a plurality of attributes associated with said data field used by said first executable application in identifying operations to be performed on said data item by at least one executable procedure for inclusion in said data field, said plurality of attributes including, at least one attribute for indicating whether a new data item is to be created by an executable procedure for inclusion in said data field.

2. A communication data format according to claim 1, wherein
said data field is used for conveying a data item, wherein said data item comprises at least one of, (a) a data object, and (b) a data object property and
said particular executable procedure is public and associated with a particular class of data object.

3. A communication data format according to claim 2, wherein
said operations to be performed comprises at least one of, (a) acquiring, (b) formatting, (c) interpreting, and (d) converting.

4. A communication data format according to claim 1, wherein
said at least one other attribute further comprises one or more of, (a) a characteristic to be used in filtering information to derive said data item, (b) placeholder data to be replaced by an acquired data item, and (c) an indicator indicating said data item comprises a list of items to be provided.

5. A communication data format according to claim 4, wherein
said list of items is in a hierarchical repetitive nested structured list of items.

6. A communication data format according to claim 1, wherein
said at least one other attribute comprises a characteristic to be used in filtering information to derive said data item for inclusion in said data field and.

7. A communication data format according to claim 1, wherein
said at least one other attribute further comprises an indicator identifying said data item as a placeholder for subsequent replacement by acquired data.

8. A communication data format according to claim 6, wherein
said characteristic is used in filtering information to select said data item from a plurality of different data items at run time of an executable procedure.

9. A communication data format according to claim 1, wherein
said first executable application includes said data item in said data field in response to a determination a requestor is authorized to access said data item and
said data format is coded to be compatible with Extensible Markup Language (XML).

10. A communication data request format embodied in a computer readable storage medium, said communication data request format being for use by a first application in acquiring data from a second application, comprising:
a data field for conveying a data item provided by said second application; and
a plurality of attributes associated with said data field for use by said second application in providing said data item in response to receiving said data request format, said plurality of attributes including,
a data type identifier for use by said second application in identifying an operation to be performed or to be excluded from being performed in processing said data item for inclusion in said data field and
at least one other attribute, for use by said second application in deriving said data item, said at least one other attribute comprising a characteristic for use in filtering information to derive said data item and placeholder data to be replaced by a desired data item.

11. A communication data request format according to claim 10, wherein
said data item comprises at least one of, (a) a data object, and (b) a data abject property and
said at least one other attribute is for use in,
identifying operations to be performed on said data item using a particular executable procedure, and
indicating whether a new object is to be created for inclusion in said data field.

12. A communication data request format according to claim 10, wherein
said data type identifier identifies said data item as a particular object type to be processed by particular executable procedures and as having associated particular object properties determining data items associated with said data type.

13. A communication data request format according to claim 10, wherein
said data item comprises at least one of, (a) a data object and b) a data object property and
said characteristic for use in filtering information to derive said data item determines properties applicable to a data object category.

14. A communication data update format embodied in a computer readable storage medium, said communication data update format being for use by a first application in updating data acquired from a second application and communicating said updated data to said second application, comprising:
a data field for conveying a data item to said second application; and
a plurality of attributes associated with said data field for use by said second application in identifying operations to be performed on said data item in updating a stored corresponding data item in response to receiving said data update format, said plurality of attributes including,
a first attribute indicating whether a new data item is to be created and stored, and
at least one other attribute, for use by said second application in updating said stored corresponding data item, said at least one other attribute comprising one of, (a) an indicator identifying said data item conveyed to said second application as being a modified version of a data item previously acquired from said second application and (b) an indicator identifying said data item conveyed to said second application as being a new data item for storage.

15. A communication data update format according to claim 14, wherein
said data field is used for conveying a data item, wherein said data item comprises at least one of, (a) a data object, and (b) a data object property and
said second application identifies an operation to be performed on said data item by a particular executable procedure is associated with a particular class of data object.

16. A communication data update format according to claim 14, wherein
said at least one other attribute includes an attribute identifying a particular stared data item to be updated of a plurality of stored data items.

* * * * *